United States Patent [19]

Loudon

[11] Patent Number: 5,758,996
[45] Date of Patent: Jun. 2, 1998

[54] DRILL CENTERING DEVICE

[76] Inventor: Gary J. Loudon, c/o Ms. Shannon Mueller, 9 Krause St., Bay Shore, N.Y. 11706-2617

[21] Appl. No.: 707,869

[22] Filed: Sep. 9, 1996

[51] Int. Cl.$^6$ .............................. B23B 49/04; B23B 49/02
[52] U.S. Cl. .................. 408/72 B; 408/104; 408/115 B; 408/241 B
[58] Field of Search ................ 408/72 R, 72 B, 408/104, 705–707, 241 B, 11 SR, 11 B

[56] References Cited

U.S. PATENT DOCUMENTS

| | | | |
|---|---|---|---|
| 673,689 | 5/1901 | Reil | 408/104 |
| 3,199,380 | 8/1965 | Threlkeld | 408/72 R |
| 3,224,021 | 12/1965 | Curran | 408/72 B |

*Primary Examiner*—Steven C. Bishop
*Attorney, Agent, or Firm*—Galgano & Burke

[57] ABSTRACT

A drill centering device for use in combination with a drill bit for drilling centered holes in an end of a generally longitudinal piece of stock, comprises a guide box having a centrally aligned inner channel dimensioned for directing a drill bit therethrough and an annular rim extending from one end of the guide box. The annular rim is symmetrical about the inner restrictive channel of the guide box and dimensioned to receive a piece of stock for drilling centered holes in the same.

20 Claims, 7 Drawing Sheets

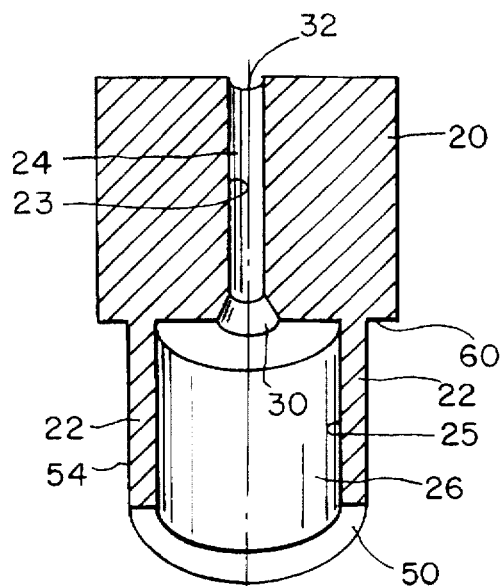
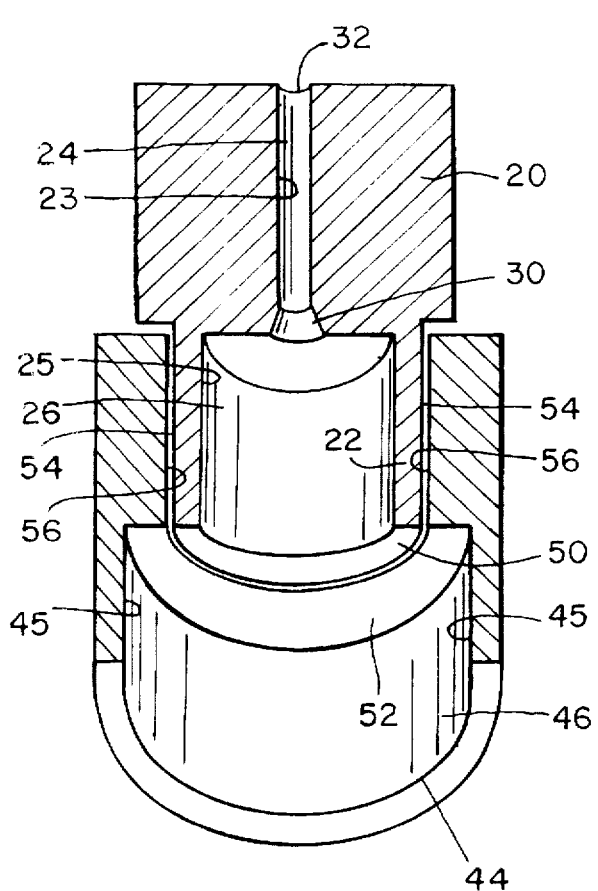

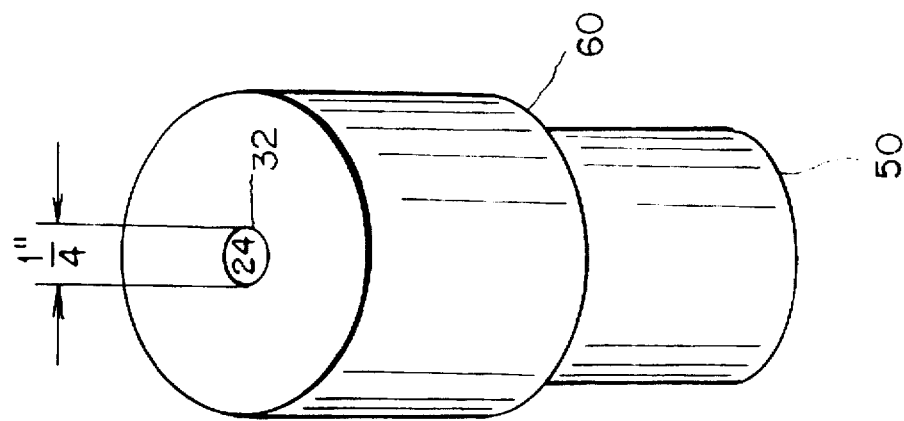
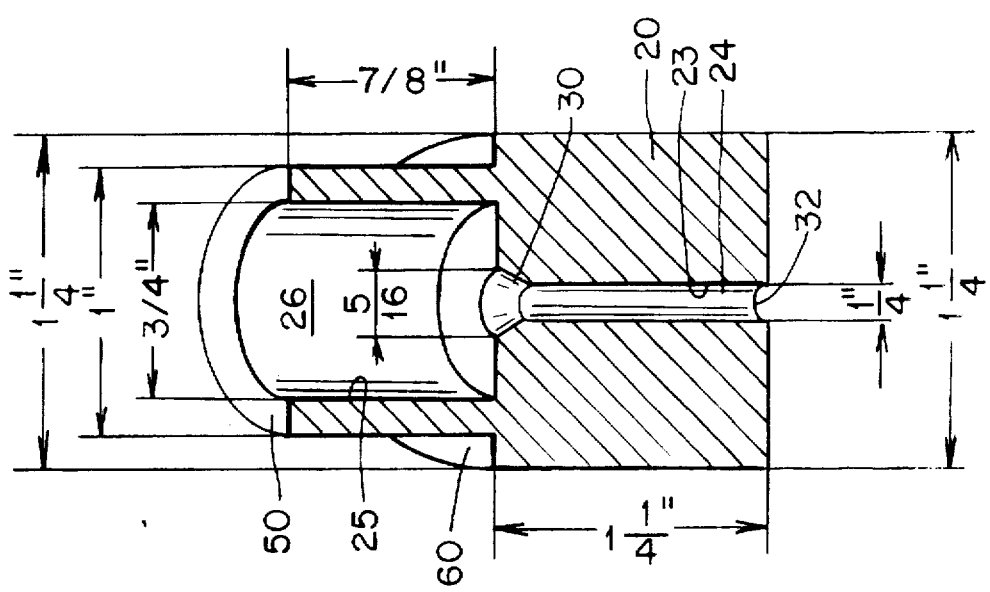
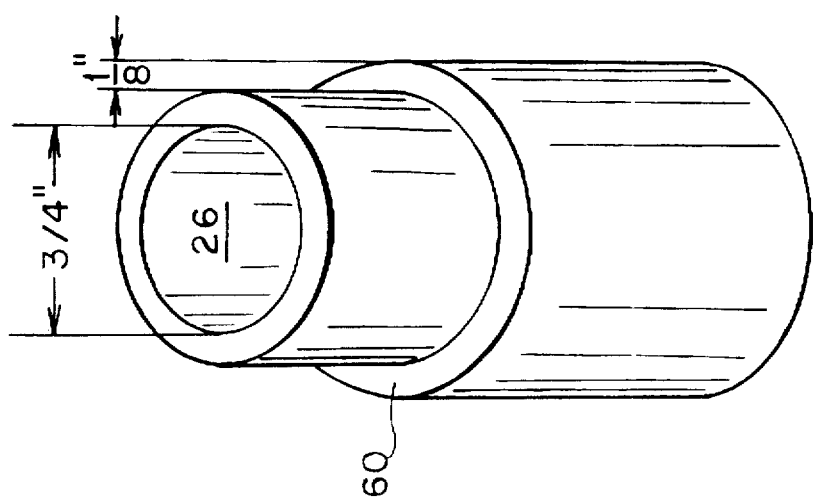

DRILL CENTERING DEVICE

The present invention relates to drill centering devices for drilling holes in a piece of stock. More particularly, the present invention relates to a novel drill centering device for use in combination with a drill bit for drilling centered holes in the end of a generally longitudinally shaped piece of stock.

BACKGROUND

Several devices for drilling holes in a piece of stock have been suggested in the past. For example, U.S. Pat. Nos. 4,375,341, 3,062,076, 2,788,684 and 1,727,061 all disclose a variety of drilling guides and jigs for aligning and drilling holes in stock in a certain fashion. However, while apparently generally acceptable for their limited functions, obvious disadvantages have become apparent when trying to employ these devices for certain purposes such as drilling holes in the center of a piece of stock.

For example, U.S. Pat. No. 4,375,341 is designed having an outer transparent tubular member for grasping a piece of stock between opposing jaws of the same in a widthwise fashion. The device is ideal for drilling holes through the side edge of a piece of stock but, because of its very design, is totally inadequate for drilling centered holes through the end of a piece of stock in a longitudinal fashion, i.e., the opposing jaws of the tubular member are incapable of grasping the stock and/or aligning the stock when vertically oriented for drilling purposes.

U.S. Pat. Nos. 3,062,076 and 1,727,061 while capable of drilling holes in the end of a piece of stock in a longitudinal fashion, are overly complicated in design and require fine manual adjustment for centering purposes.

U.S. Pat. No. 2,788,684 discloses a drilling jig capable of drilling perpendicular holes through the surface of a piece of stock. This device is not designed for alignment or centering purposes and is inadequate for end drilling since the device is incapable of holding the stock in a centered fashion for drilling.

It would therefore be desirable to provide a drill centering device which can overcome the aforesaid difficulties and other disadvantages known in the prior art.

SUMMARY OF THE INVENTION

While apparently generally acceptable for their intended purposes, so far as is known, none of the prior art devices afford a drill centering device for use in combination with a drill bit for drilling centered holes in an end of a generally longitudinal piece of stock.

Accordingly, it is an object of the present invention to provide a novel drill centering device which can quickly and easily align the end of a generally longitudinal piece of stock for drilling purposes.

It is another object of the present invention to provide a drill centering device which is economical to manufacture, durable and of relatively simple construction and design.

More particularly, it is an object the present invention to provide a drill centering device which is versatile and can drill centered holes in many different sizes of stock.

These and other aspects of the present invention are described in greater detail below.

BRIEF DESCRIPTION OF THE DRAWINGS

In the drawings, wherein similar reference characters denote similar elements throughout the several views:

FIG. 6 is a cross-sectional view of both a guide box and an outer bushing;

FIG. 7 is a partial cross-sectional view of a guide box and an outer bushing;

FIG. 11a is a top perspective view of a two-piece guide box;

FIG. 11b is a top cross-section of a two-piece guide box; and

FIG. 11c is a bottom perspective view of a two-piece guide box.

DETAILED DESCRIPTION

One embodiment the present invention comprises, a drill centering device for use in combination with a drill bit for drilling centered holes in an end of a generally longitudinal piece of stock. This device comprises a guide box comprising a centrally aligned inner restrictive channel generally dimensioned for directing a drill bit therethrough and an annular rim extending from one end of the guide box. The annular rim is preferably symmetrical about the inner restrictive channel and receives the piece of stock.

In one particular embodiment of the present invention, the annular rim of the guide box is selectively engageable with at least one bushing. In another embodiment, each bushing is selectively engageable with at least one additional bushing.

Preferably, the bushing comprises an inner cavity having sidewalls generally dimensioned to receive a piece of stock. Advantageously, the sidewalls of the bushing are centrally aligned with the inner restrictive channel of the guide box and are also symmetrical about the same. Most preferably, the bushing is selectively engageable with the annular rim of the guide box. In some cases, however, the bushing may be selectively engageable with another portion of the guide box.

Most desirably, the outer face of the bushing is receivable within the annular rim of the guide box. In some cases, however, it may be desirable to have the annular rim selectively receivable within the bushing.

Preferably, the bushing comprises a restricting member for limiting the distance that the bushing can be received within the guide box or, in another embodiment, a second bushing. In one particular embodiment, an annular lip extends from one end of the bushing and acts to restrict movement of the bushing.

In one particular embodiment, the bushing comprises a coupling member which is selectively engageable with the guide box. Preferably, the coupling member engages the annular rim of the guide box, but may also engage other portions of the guide box. In one particular embodiment, the coupling member is receivable within the annular rim of the guide box. In another embodiment, the outer surface of the annular rim is received by the inner surface of the coupling member.

Figure 1:
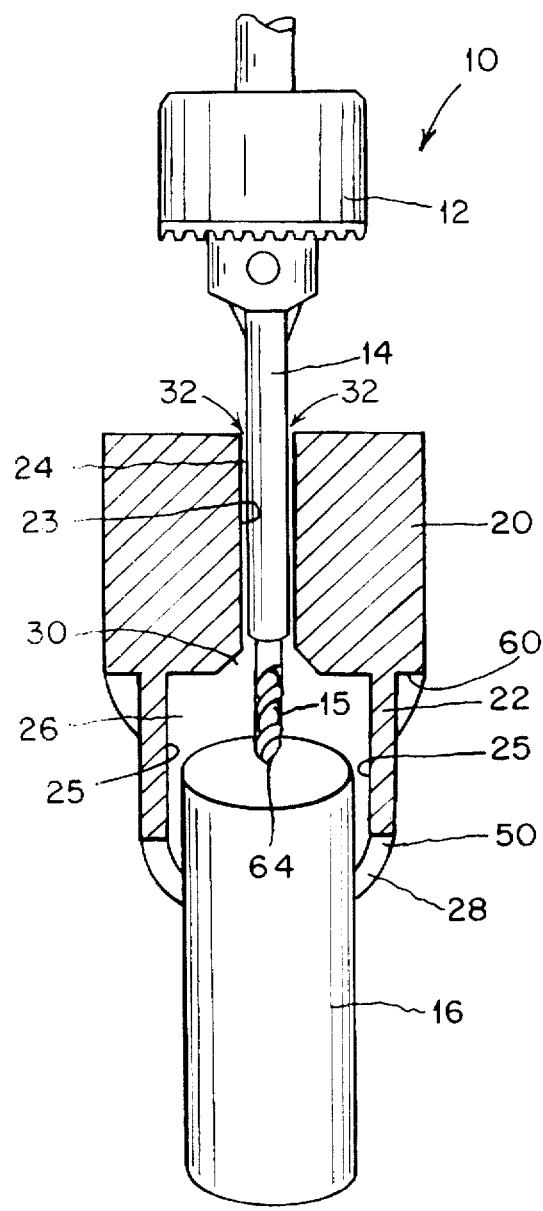
FIG. 1 is a partial cross-sectional view of the present invention illustrating a guide box receiving a piece of stock shown in combination with a drill (shown in part) and a drill bit extension.

Turning now to the drawings, and in particular FIG. 1, therein illustrated is a novel drill centering device according to one embodiment of the present invention generally designated by reference number 10. FIG. 1 depicts drill centering device 10 in combination with a drill 12 (shown in part) and an extended drill shank or drill bit extension 14 engaging a generally longitudinal piece of stock 16 for drilling a centered hole in the stock 16. Drill centering device 10 comprises a guide box 20 which has an inner restrictive channel 24 located therein for guiding drill bit extension 14 from guide box opening 32 through to guide box outlet 30 which, preferably, is generally frustoconically shaped to collect or re-direct drill shavings away from the drill bit 15. Guide box 20 also comprises an annular rim 22 extending from distal end 60 of guide box 20. The annular rim 22 comprises an inner chamber 26 defined by inner surface 25 generally dimensioned to receive stock 16.

In the particular embodiment shown in FIG. 1, opening 32 is located in the epicenter of guide box 20 and channel 24 directs drill bit 15 and drill bit extension therethrough in a perpendicular manner such that drill tip 64 of drill bit 15 exits channel 24 through outlet 30 into the center of chamber 26 and drill tip 64 engages stock 16 in the exact center. Preferably, the drill bit extension 14 is generally dimensioned so that there is minimal clearance (e.g., between one-thousandths of an inch to three-thousandths of an inch) between the drill bit extension 14 and channel 24 (The drawings depict a larger clearance between these two elements because the drawings are not to scale). Annular rim 22 is generally dimensioned to receive stock 16 in an upright or vertically oriented manner so that drill tip 64 bores centrally aligned holes along the longitudinal axis of stock 16 when oriented as shown in the drawings.

Figure 2:
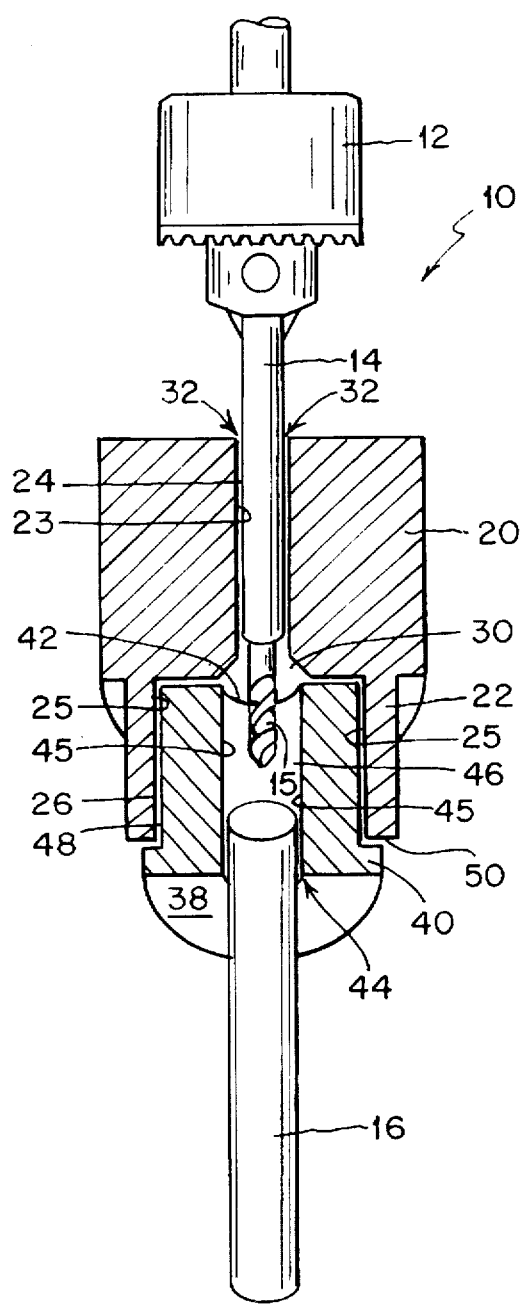
FIG. 2 is a partial cross-sectional view of a guide box receiving a bushing and the bushing receiving a piece of stock shown in combination with a drill (shown in part) and a drill bit extension.

In another embodiment of the present invention shown in FIG. 2, annular rim 22 is generally dimensioned to selectively engage bushing 38. Bushing 38 comprises cavity 46 which is defined by inner sidewall 45 and extends from top opening 42 to bottom opening 44. Cavity 46 is generally dimensioned to receive stock 16 through bottom opening 44 in an upright or vertically oriented fashion. In a preferred embodiment, cavity 46 is centrally aligned with and symmetrical about channel 24 so that drill bit extension 14 is directed through both channel 24 and cavity 46. In this manner, drill tip 64 engages stock 16 at the center for drilling purposes.

In the particular embodiment shown in FIG. 2, the outer surface 48 of bushing 38 is snugly received within annular rim 22 of guide box 20 and engages the inner surface 25. In this embodiment, bushing 38 additionally comprises annular lip 40 which, when engaged, will abut against distal end 50 of annular rim 22 during actual engagement thus allowing a user to selectively limit the distance that bushing 38 can be received within annular rim 22.

Figure 3:
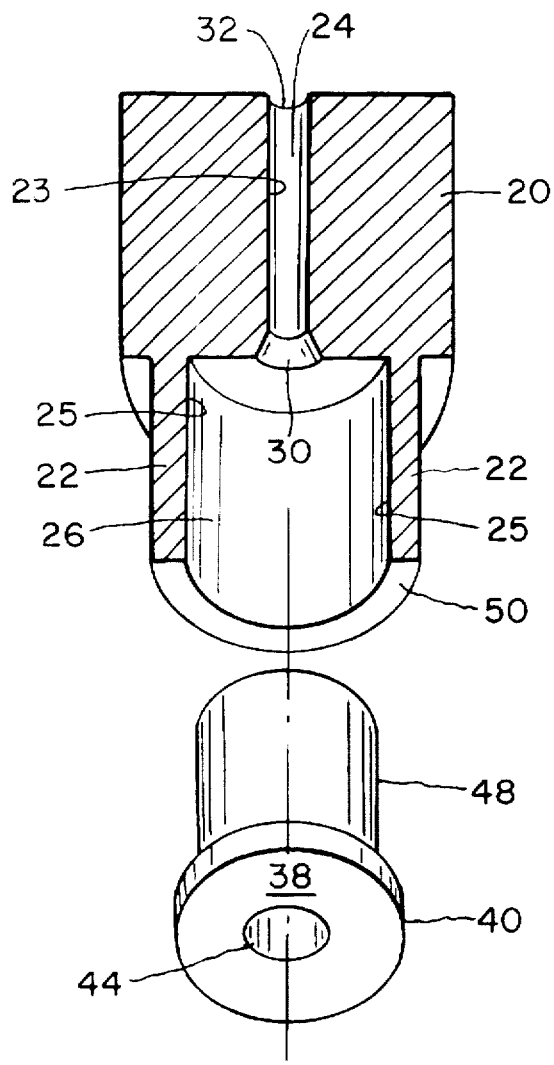
FIG. 3 is a partial cross-sectional view of a guide box showing the annular rim extending therefrom and a bushing prior to engagement.
Figure 4:
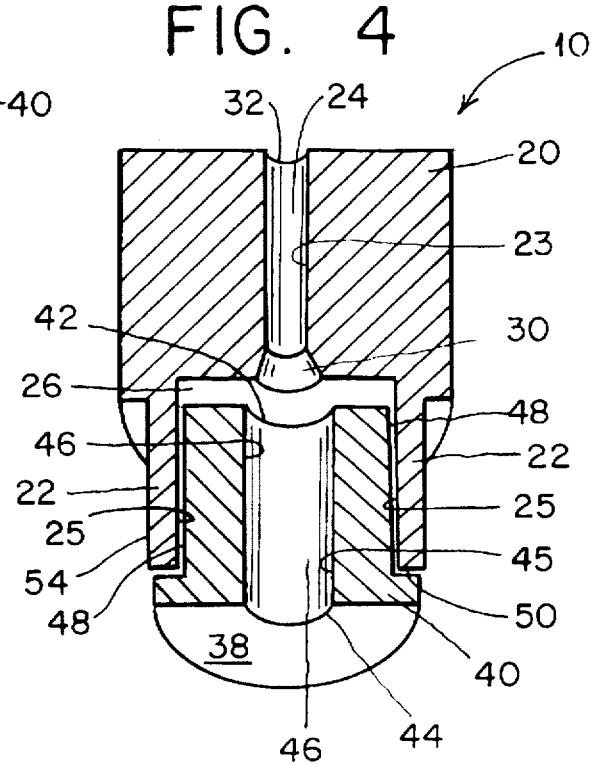
FIG. 4 is a cross-sectional view of both a guide box and a bushing.

FIGS. 3 and 4 depict drill centering device 10 and an accompanying bushing 38 when standing alone without drill, drill bit extension (12, 14), or stock 16. FIG. 3 shows a cross-section of guide box 20 and a perspective view of bushing 38 prior to engagement, while FIG. 4 shows a cross-sectional view of guide box 20 receiving bushing 38. In the particular embodiment of FIG. 4, outer surface 48 of bushing 38 is shown engaged with inner surface 25 of annular rim 22 in a friction-fit manner. In such cases, it may be preferable to engage the two components (22 and 38) in another manner.

Figure 5:
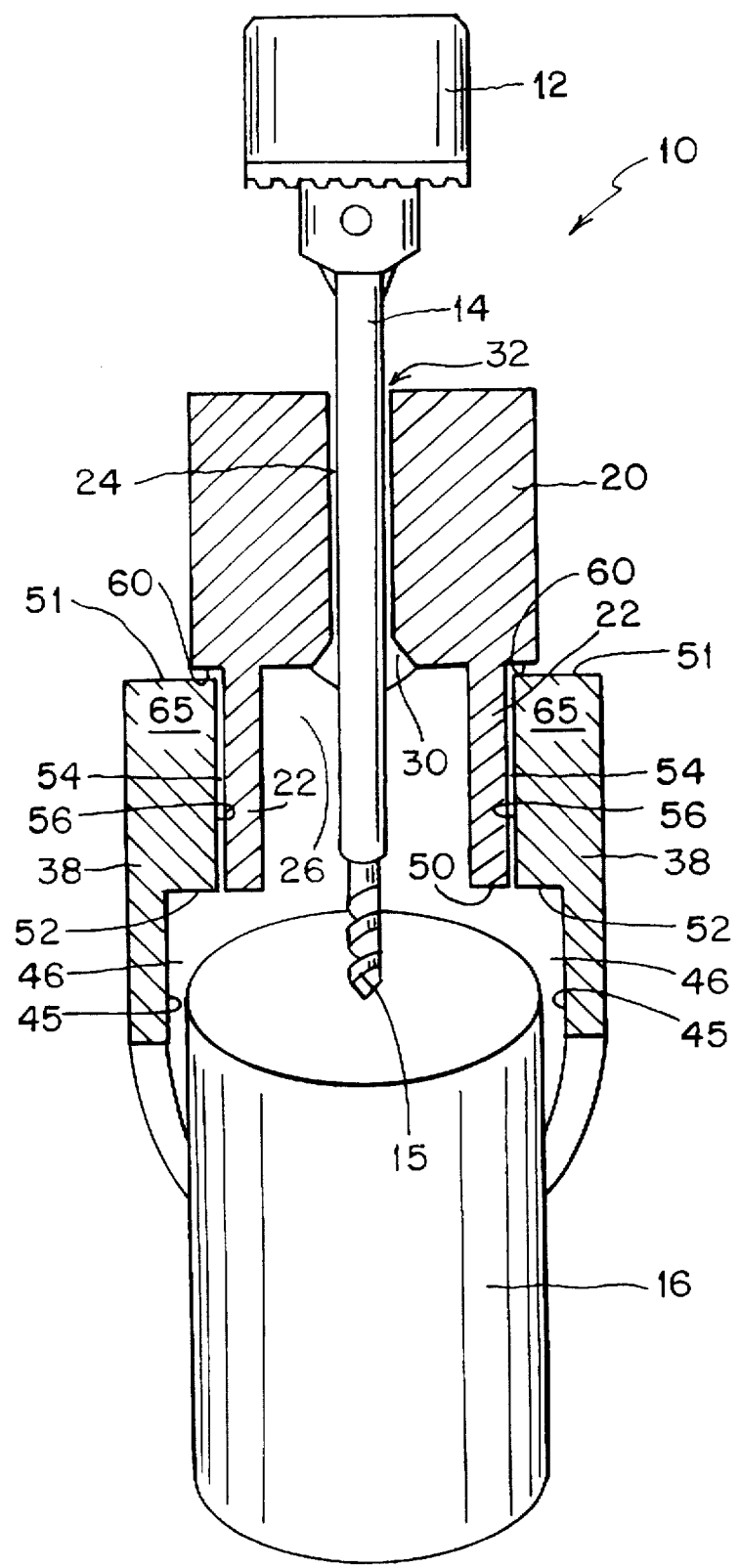
FIG. 5 is a partial cross-sectional view of another embodiment of the present invention illustrating a guide box with an outer bushing engaging a piece of stock shown in combination with a drill (shown in part) and a drill bit extension.

In FIG. 5, bushing 38 additionally comprises coupling member 65 which symmetrically protrudes inwardly from a portion of inner surface 45 of bushing 38 generally located near top opening 42 which allows drill centering device 10 to center larger pieces of stock without having to resize the guide box 20. Coupling member 65 comprises inner surface 56 which engages outer surface 54 of annular rim 22 in a friction-fit or other similar manner. Coupling member 65 also comprises top edge 51 which, when coupling member 65 is engaged, abuts distal end 60 of guide box 20. As can be appreciated, the thickness of coupling member 65 can be varied to accommodate different sizes of stock.

Preferably, when bushing 38 is engaged with guide box 20, bottom edge 52 of coupling ring 65 and outer edge 50 of annular rim 22 align to further define cavity 46 (Seen best in FIG. 6). In this particular embodiment, as opposed to the other embodiments shown in FIGS. 1–4, stock 16 is not received within annular rim 22 (or annular rim 22 and an internal bushing 38) and edges 50 and 52 mutually cooperate (or in some cases, individually act) to limit the distance that stock 16 can be received within cavity 46.

FIG. 6 depicts a cross-sectional view of the drill centering device 10 of FIG. 5 shown in engaged position when standing alone without drill 12 and drill components 14 or stock 16. As can be seen most clearly in this figure, bushing 65 engages annular rim 22 of guide box 20 in precise symmetric fashion so that when stock 16 is received within cavity 46 (also preferably symmetrical) inner restrictive channel 24 guides drill bit 15 and drill bit extension 14 to the exact center of stock 16 for drilling.

Figure 8:
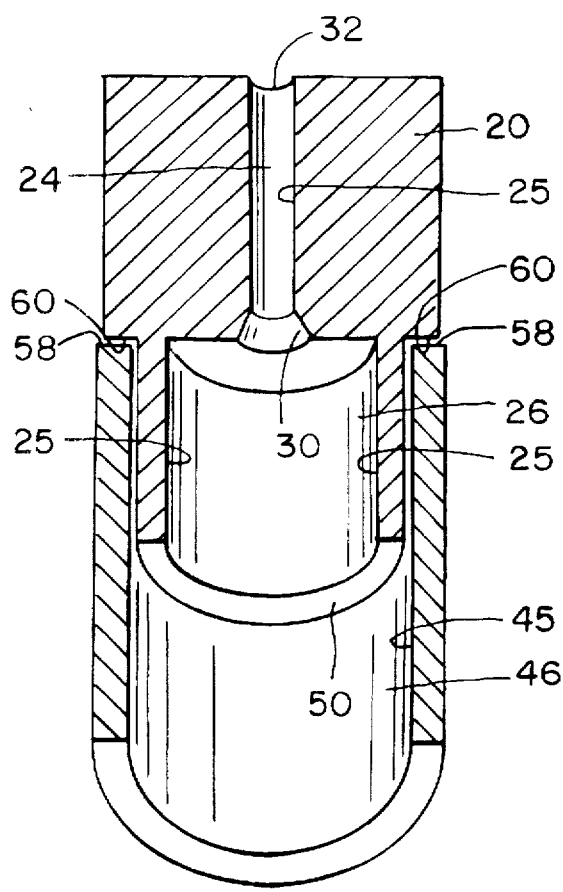
FIG. 8 is a cross-sectional view of a guide box and an outer bushing.

FIG. 7 shows a cross-sectional view of guide box 20 and a perspective view of bushing 38 prior to engagement. As can be appreciated, the diameter of inner surface 45 of bushing 38 slightly exceeds the outer surface 54 diameter of annular rim 22 so that the two components (38 and 22) engage one another in a snug or friction-fit manner as depicted in FIG. 8. In the particular embodiment of FIGS. 7 and 8, an inner coupling member is not needed and bottom edge 50 of annular rim 22 individually acts to prevent stock (not shown) from entering chamber 26.

Figure 9A:
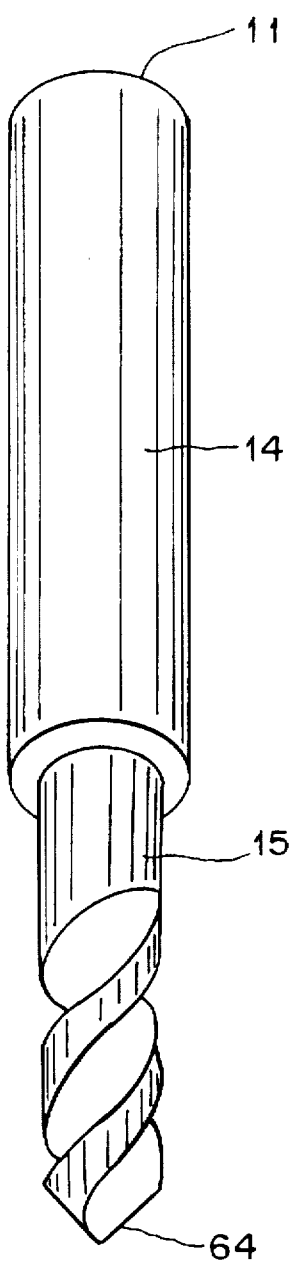
FIG. 9a is a perspective view of a drill bit extension.
Figure 9B:
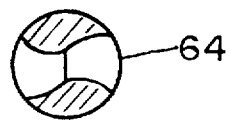
FIG. 9b is a front end view of the drill tip of a drill bit extension.
Figure 10A:
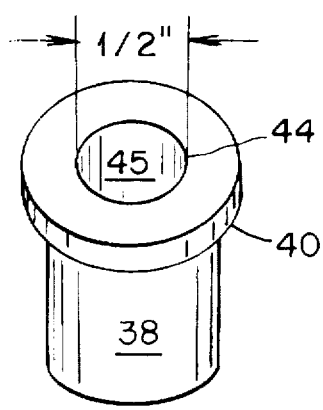
FIGS. 10a–10i are perspective and cross sectional views of differently sized bushings and their respective internal dimensions.
Figure 10B:
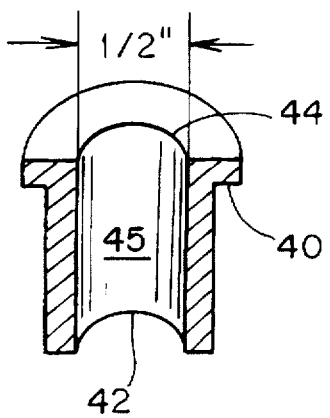
Figure 10C:
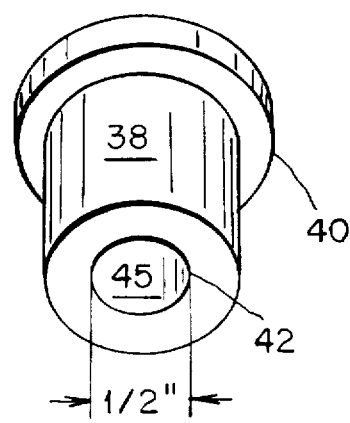
Figure 10D:
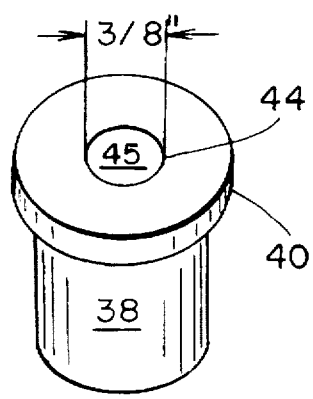
Figure 10E:
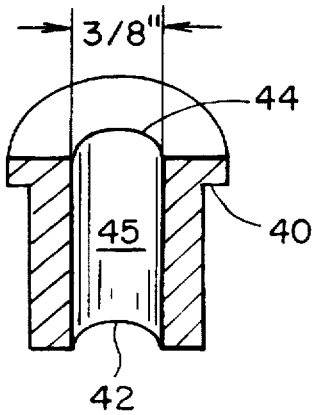
Figure 10F:
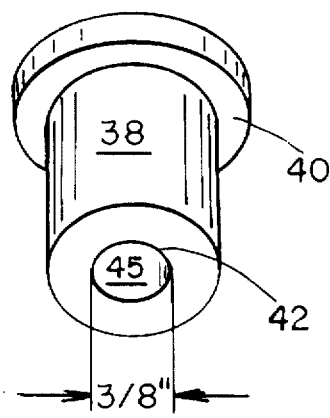
Figure 10G:
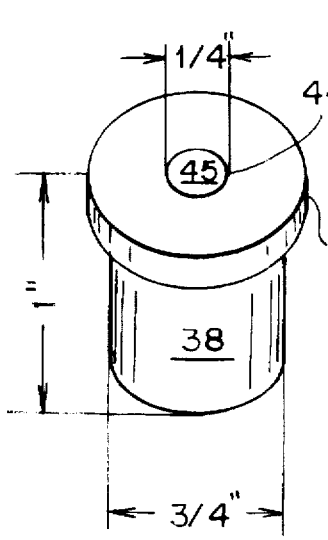
Figure 10H:
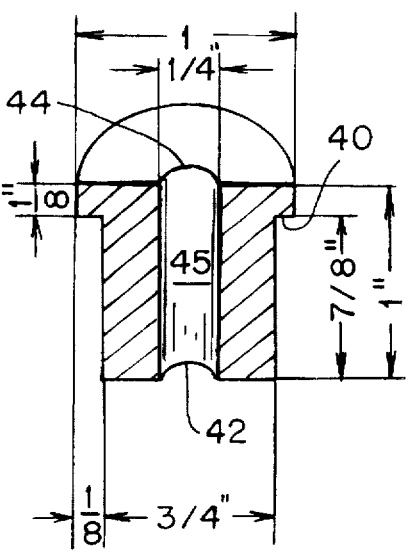
Figure 10I:
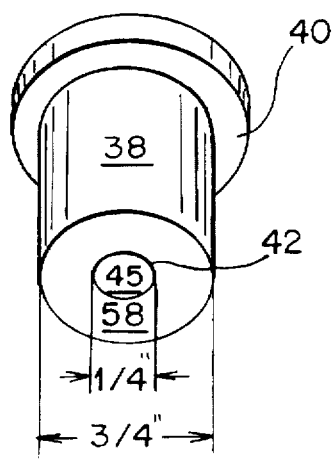

FIG. 9a depicts a close-up view of a drill 15 and a drill bit extension 14. Drill bit 15 and drill tip 64 (seen best in FIG. 9b) can be sized accordingly to s electively drill holes of varying sizes in stock 16. Opposite end 11 of drill bit extension 14 is adapted to engage drill 12 (not shown) in a standard or customary manner.

Turning now to the several illustrative embodiments of bushings 38 depicted in FIGS. 10a–10i, it can be appreciated from the present disclosure that the diameter of inner surface 45 can be varied to accommodate a wide range of stock sizes including, but not necessarily limited to, standard stock sizes. The dimensions of the bushing can also be varied as shown in the drawings or according to a specific need or a particular preference; however, it is important to note that the particular dimensions shown in these figures are for illustrative purposes only. Likewise, FIGS. 11a–11c depict a guide box 20 with standardized dimensions to accommodate a certain sized piece of stock and/or bushing 38.

Preferably, as shown in the various figures, other embodiments of the drill centering device can be designed without departing from the scope of the present invention. For example, the drill centering device 10 can be dimensioned to receive/engage a generally circular piece of stock 16 within cavity 26 or chamber 46, however, in some cases it may be desirable to drill centered holes in differently shaped pieces of stock and thus a drill centering device 10 may be designed with a differently shaped cavity 26 or chamber 46 to accommodate the same. In other cases, it may be desirable to locate opening 32 in an centrally offset position in guide box 20 so that drill tip 64 engages stock 16 at a centrally offset position and bores a centrally offset hole in stock 16.

Preferably, the annular rim 22 and the bushing 38 are engaged snugly or in a friction-fit manner, but in some cases it may be desirable to engage the two components in a different manner such as magnetically, snap-fit, screw and thread or any other common alternative.

I claim:

1. A drill centering device for use in combination with a drill bit for drilling centered holes in an end of a first generally longitudinal piece of stock having a first cross-sectional shape, comprising:

a guide box comprising a centrally aligned inner restrictive channel generally dimensioned for directing a drill bit therethrough; and an annular rim extending from one end of said guide box wherein said annular rim has a second inside cross-sectional shape substantially equal to said first cross-sectional shape and is symmetrical about said inner restrictive channel and closely receives said first piece of stock.

2. A drill centering device according to claim 1 wherein said annular rim of said guide box is selectively engageable with at least one bushing, said bushing having a third cross-sectional shape substantially equal to a fourth cross-sectional shape of a second piece of stock.

3. A drill centering device for use in combination with a drill bit for drilling centered holes in an end of a generally longitudinal piece of stock, comprising:

a guide box comprising a centrally aligned inner restrictive channel generally dimensioned for directing a drill bit therethrough;

an annular rim extending from one end of said guide box;

a bushing comprising an inner cavity comprising sidewalls generally dimensioned to receive said piece of stock, said sidewalls centrally aligned with said inner restrictive channel of said guide box and said sidewalls being symmetrical about said inner restrictive channel; and said bushing removably engageable with said annular rim.

4. A drill centering device according to claim 3 wherein the outer face of said bushing is receivable within said annular rim of said guide box.

5. A drill centering device according to claim 3 wherein said bushing comprises means for restricting the distance that said bushing can be received within said annular rim of said guide box.

6. A drill centering device according to claim 5 wherein said restricting means comprises an outer annular lip extending from one end of said bushing.

7. A drill centering device according to claim 3 wherein said bushing comprises a coupling member which is selectively engageable with said annular rim of said guide box.

8. A drill centering device according to claim 7 wherein said coupling member is adapted to receive said annular rim of said guide box.

9. A drill centering device according to claim 8 wherein said bushing comprises means for restricting the distance that said bushing can be received within said annular rim of said guide box.

10. A drill centering device according to claim 9 wherein said restricting means comprises an outer annular lip extending from one end of said bushing.

11. A drill centering device according to claim 8 wherein the inner surface of said coupling member receives the outer surface of said annular rim of said guide box.

12. A drill centering device according to claim 3 wherein said bushing is selectively engageable with a second bushing for receiving said piece of stock.

13. A drill centering device for use in combination with a drill bit for drilling centered holes in an end of a first generally longitudinal piece of stock having a first cross-sectional shape, comprising:

a guide box comprising a first portion and a second portion;

said first portion adapted for receiving a drill bit and comprises a centrally aligned inner restrictive channel generally dimensioned for directing said drill bit therethrough; and said second portion extending from said first portion, said second portion comprising an annular rim which has a second inside cross-sectional shape substantially equal to said first cross-sectional shape and generally dimensioned to closely receive said first piece of stock.

14. A drill centering device according to claim 13 wherein said second portion further comprises an inner restrictive channel generally dimensioned for directing said drill bit therethrough, said inner restrictive channel of said second portion centrally aligned with said inner restrictive channel of said first portion.

15. A drill centering device according to claim 13 further comprising:

a bushing comprising an inner cavity for receiving a second piece of stock, said sidewalls centrally aligned with said inner restrictive channel of said first portion of said guide box and said sidewalls being symmetrical about said inner restrictive channel of said first portion; and said bushing selectively engageable with at least one of said portions.

16. A drill centering device according to claim 15 wherein said bushing is removably engageable with said second portion.

17. A drill centering device for use in combination with a drill bit for drilling centered holes in an end of a generally longitudinal piece of stock, comprising:

a guide box comprising a centrally aligned inner restrictive channel generally dimensioned for directing a drill bit therethrough;

an annular rim extending from one end of said guide box;

a bushing comprising an inner cavity comprising sidewalls generally dimensioned to receive said piece of stock and a coupling member which is adapted to receive said annular rim of said guide box;

said sidewalls centrally aligned with said inner restrictive channel of said guide box and said sidewalls being symmetrical about said inner restrictive channel; and said bushing removably engageable with said annular rim.

18. A drill centering device according to claim 17 wherein said bushing comprises means for restricting the distance that said bushing can be received within said annular rim of said guide box.

19. A drill centering device according to claim 18 wherein said restricting means comprises an outer annular lip extending from one end of said bushing.

20. A drill centering device according to claim 17 wherein the inner surface of said coupling member receives the outer surface of said annular rim of said guide box.

* * * * *